United States Patent
Robeson et al.

(12)

(10) Patent No.: US 6,235,811 B1
(45) Date of Patent: May 22, 2001

(54) EPOXY RESIN-VINYL ACETATE POLYMER BLENDS

(75) Inventors: Lloyd Mahlon Robeson, Macungie; David Alan Dubowik, Kempton, both of PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 09/327,731

(22) Filed: Jun. 8, 1999

(51) Int. Cl.$^7$ ................. C08K 3/20; C08L 63/02
(52) U.S. Cl. ............ 523/406; 523/412; 525/327.6; 525/330.5
(58) Field of Search ............. 525/327.6, 330.5; 523/406, 412

(56) References Cited

U.S. PATENT DOCUMENTS

| | | | |
|---|---|---|---|
| 4,108,819 | 8/1978 | Oyamada et al. | 260/29.6 NR |
| 5,037,700 | * 8/1991 | Davis | 428/414 |
| 5,177,122 | 1/1993 | Shih | 523/201 |
| 5,389,703 | 2/1995 | Lee | 523/406 |

OTHER PUBLICATIONS

Young, G. C., "Modifying Latex Emulsions With Epoxy Resin Dispersions", *Adhesives Age*, pp. 24–27 (1996).

* cited by examiner

*Primary Examiner*—Robert Dawson
*Assistant Examiner*—D. Aylward
(74) *Attorney, Agent, or Firm*—Mark L. Rodgers (57) ABSTRACT

Hybrid polymeric compositions of epoxy resin and vinyl acetate polymer are combined in an aqueous emulsion also containing an emulsifying agent and isophoronediamine as a hardener for the epoxy resin. The emulsion is stable for long periods of time but can be cast and cured at room temperature, providing a one-pot system for the preparation of protective coatings, laminating adhesives, and the like. The vinyl acetate polymer must be emulsion polymerized independently of the epoxy resin and is preferably a copolymer of vinyl acetate with ethylene or n-butyl acrylate. The pot life of these hybrid polymer emulsions containing the epoxy hardening agent is at least one month and frequently as long as a year.

14 Claims, 1 Drawing Sheet

FIG. 1

EPOXY RESIN-VINYL ACETATE POLYMER BLENDS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to a curable polymer emulsion composition containing a blend of an epoxy polymer and a polymer of vinyl acetate. In another aspect it relates to a stable epoxy-vinyl acetate polymeric emulsion which can be cured and cast at room temperature without the use of additional curative. In still another aspect it relates to a method of formulating an emulsion of epoxy resin and a vinyl acetate polymer with an amine curative to form a composition that is stable over long periods of time but can be cast and cured at room temperature. It also relates to the cast solid product obtained from such compositions.

Recent advances in polymer chemistry include the combination of thermosetting and thermoplastic polymers to take advantage of the properties of each type of polymer. For example, epoxy thermosetting polymers are often diluted with solvent in order to decrease viscosity for better coating or adhesive processing. For environmental and health reasons water-borne thermoplastic polymers are more acceptable, but these materials often have less water resistance and durability than their thermosetting counterparts. Combining epoxy resins with emulsion polymers such as the vinyl acetate polymers has, therefore, offered a good combination of properties including improved flexibility for the epoxy resin. The epoxy polymer, of course, must be cured with a suitable hardener, generally an amine, to reach its cross-linked state. Therein lies the problem with such polymer combinations because while the amine cross-linker can aid in water dispersion of the epoxy component, it also reduces the storage stability of the polymer mixture by causing premature coagulation. Solving this problem has occupied considerable attention in the polymer industry.

One approach to the problem has been to use what is known as a "two-pack" system. As described in U.S. Pat. No. 4,108,819, Oyamada et al. (1978) vinyl acetate and ethylene are copolymerized in the presence of an epoxide which is dissolved in the vinyl acetate before adding the ethylene under polymerization conditions. Otherwise, it is stated, the vinyl acetate-ethylene copolymer (VAE) and the epoxy resin are present heterogeneously leading to inferior products. The curing agent, such as xylylene diamine, is kept separate from the epoxyNAE combination until application. This is workable but is cumbersome since it requires special mixing at the point of use.

A procedure designed to overcome the "two pack" difficulty and develop a "one-pot" system is described by U.S. Pat. No. 5,177,122, Shih (1993). This rather complex procedure produces "core-shell" latices of epoxy resin and polymer of an ethylenically unsaturated monomer, such as vinyl acetate. As in the '819 patent, cited above, the vinyl acetate is polymerized in the presence of an epoxy resin to form the core of the composition. Then a hydroxyl or carboxyl containing monomer is polymerized in the presence of the core polymers. First the epoxy resin is dissolved in the core monomer, i.e. vinyl acetate, which is then emulsified and polymerized or copolymerized, as in the case of copolymers of vinyl acetate and ethylene. This forms the "core". The "shell" is then formed by polymerizing an ethylenically unsaturated monomer plus 0.5 to 10 weight percent of the hydroxyl or carboxyl functional monomer in the presence of the core. An amine hardener, such as isophoronediamine, can then be added without premature coagulation. In a comparative example of this patent, this hardener was added to the core polymer without the shell and the mixture gelled within five hours. When the hardener was added after formation of the shell the latex remained stable for more than one month. It is taught that the diamine cannot even be added during the formation of the shell for to do so results in coagulation of the latex.

U.S Pat. No. 5,389,703, Lee (1995) describes still another method of creating a one-pot system of epoxy resin and polymer of ethylenically unsaturated monomer such as an acrylate. These hybrid polymers are made by preparing (1) an organic phase of the epoxy resin and the monomers using an oil soluble surfactant, and (2) an aqueous phase containing a water soluble surfactant. These phases are then combined and the monomers are polymerized to form a water-based emulsion. Even after addition of a hardener such as ethylenediamine the dispersion remained stable without gelation for 4 to 6 months. Omitting either the oil soluble surfactant or the water-soluble surfactant resulted in the formation of coagulum during the polymerization.

A good discussion of the possibilities offered by the combination of epoxy resins with latex emulsions is given in an article by G. C. Young, "Modifying Latex Emulsions With Epoxy Resin Dispersions", *Adhesives Age*, Sep. 1996, pp. 24–27. Evaluations are described for several types of polymer modifications by the addition of water-based epoxy resin dispersions, for example in the range of 10 to 20 weight percent epoxy resin, to latex emulsions of polymers of vinyl acetate/ethylene, polyvinyl acetate, ethylene/vinyl chloride, polyvinyl chloride, and acrylic polymer. The control of pH of the water-borne epoxy dispersion is said to be important in preventing agglomeration of the latex. The epoxy can be cured in the latex system by addition of amine curing agents. Dicyanodiamide is said to be a latent curative and can produce one-package systems. On the other hand, aliphatic, cycloaliphatic and amido amines are said to react quickly at ambient conditions to produce fully cured networks in one to seven days. Although the potential of water-borne epoxy/latex polymer dispersions is highly touted by this article, it does not provide much help toward solving the problem of long term stability in one-pot systems which are needed by the industry.

SUMMARY OF THE INVENTION

We have now found that a stable one-pot system of water-borne epoxy resin and a polymer of vinyl acetate can be formed by using isophoronediamine as the epoxy curative. This behavior is specific to certain vinyl acetate polymers and isophoronediamine which cooperate in combination with a liquid epoxy resin in a unique way to form emulsions that can be stored for extended periods of time. This composition can then be cast into coherent films, sheets, coatings, and the like without the necessity of adding additional curative for the epoxy resin. The vinyl acetate polymers which exhibit this behavior are homopolymers of vinyl acetate and copolymers of vinyl acetate with a lower olefin, a lower acrylate, or maleic anhydride. The preferred comonomers are ethylene and n-butyl acrylate and the preferred copolymers are those containing more than 60 mole percent of vinyl acetate.

The vinyl acetate polymer must be formed independently from the epoxy resin. In other words, the vinyl acetate is polymerized in an emulsion system and then combined with the epoxy resin, creating an emulsion of epoxy, vinyl acetate polymer, and emulsifier which usually is the surfactant used in the vinyl acetate polymerization process. Isophoronediamine is incorporated into the emulsion of epoxy and vinyl acetate polymer to provide the epoxy hardener required for the curing of the product. After casting, the product exhibits good physical properties making it suitable for many applications, such as in the production of polymeric sheets, films, protective coatings, caulking, sealant, adhesives, and the like.

DETAILED DESCRIPTION OF THE INVENTION

This invention solves a problem that has long troubled formulators of hybrid polymers of epoxy resins and polyesters. The problem to which an answer has been sought is how to provide an aqueous dispersion of such polymers that is stable at ambient temperatures for long periods of time but can be cast and cured without additional formulation at the point of use. Such aqueous dispersions are referred to as "one pot" systems since they contain all the components necessary for use in the production of films, coatings, adhesives, and the like. They are to be distinguished from the well-known "two-pack" systems that require the curative or cross-linking component to be kept separate from the polymer component until just before application. These two-pack systems, when used on a large, commercial scale require suitable mixing equipment to formulate the product at the point of use, and this limits their practicality in many situations.

We have discovered that a unique interaction exists between a liquid epoxy resin, certain independently formed polymers of vinyl acetate, and the epoxy hardener, isophoronediamine. These components, when combined in an aqueous dispersion with an emulsifier of the type used in vinyl acetate emulsion polymerization, remain stable for periods of one to several months, often up to a year, without coagulation or irreversible sedimentation. When the dispersions of the invention are cast in a way that permits dehydration of the emulsion, solid, uniform products are obtained with good physical properties that are improved over those achieved with a vinyl acetate polymer alone. The hybrid polymer of epoxy resin and vinyl acetate polymer, once cured, takes advantage of the strengthening contribution of the epoxy, which is why such hybrid polymers are so attractive to industrial users.

One of the principal advantages of the products of the invention is that they can be cast and cured at room temperature. Also, since they are colorless they can be used in many applications, such as for protective coatings, where discoloration is a serious drawback. These advantages set the invention apart from other one pot systems, which require heat for adequate cure or develop discoloration in storage or use. Furthermore, the products of the invention have no toxicity problems that would disqualify other compositions using certain types of epoxy hardeners. Of course, since these compositions are water-based, they do not introduce the health and safety concerns that accompany use of volatile organic chemicals. Also, the low viscosity of the emulsions of the invention makes them easy to apply to various surfaces in the casting operation.

The epoxy resins that can be used in the invention are materials well known in the art and any of these epoxies are suitable provided they are liquid. By this it is meant that they are liquid at room temperature or can be liquefied to the point where they are pourable or flowable without pressure at temperatures under 100° C. Although such epoxy resins include a broad range of compositions, the preferred epoxy resin is the diglycidyl ether of Bisphenol A, which can be represented by the chemical structure:

where R represents a phenylene group and n is 0 to 5 and + is an isopropylidene group. Other possible variations include replacing the isopropylidene group in the formula with where R' is a phenyl group.

In addition to the Bisphenol derived epoxies, one can use epoxy phenol novolac resins, tetraglycidyl ether of tetrakis (4-hydroxyphenyl) ethane, N,N,N',N'-tetraglycidyl-4, 4'diaminodiphenylmethane, triglycidyl isocyanurate, triglycidyl-p-aminophenol, and the like as additives up to 25 weight percent of the Bisphenol derived epoxy. Aliphatic and cycloaliphatic epoxy resins can also be used at addition levels of less than 25 weight percent of the epoxy resins derived from Bisphenols. Examples of such resins include the diglycidyl ether of butane diol, 3,4-epoxycyclohexyloxirane, bis(3,4-epoxy-cyclohexylmethyl) adipate, 3',4'-epoxycyclohexylmethyl epoxycyclohexanecarboxylate, 2-(3',4'-epoxycyclohexyl)-5, 1"-spiro-3",4"-epoxycyclohexane-1,3-dioxane, the diglycidyl ester of hexahydrophthalic acid, epoxidized natural oils such as epoxidized soybean oil and epoxidized linseed oil, and the like. For improved weatherability, hydrogenated versions of the diglycidyl ether of Bisphenol A can be employed in this invention.

The polymer of vinyl acetate includes the homopolymer, poly(vinyl acetate), and copolymers of vinyl acetate with lower olefins, lower acrylates or maleic anhydride. By lower olefins is meant olefins having two to five carbon atoms per molecule, for example, ethylene, propylene, n-butene, isobutene, and isopentene-1, and the like. By lower acrylates is meant acrylate monomers such as n-butyl acrylate, methyl acrylate, ethyl acrylate, methyl methacrylate, acrylic acid, methacrylic acid, and the like. Of these comonomers, it is preferred to use ethylene or n-butyl acrylate. Copolymers of vinyl acetate and ethylene are most preferred and are referred to as VAE polymers. When ethylene is the comonomer, the polymerization is conducted under pressure that can be controlled to obtain the desired level of ethylene incorporated into the copolymer. It is preferred that these copolymers contain at least 60 weight percent vinyl acetate.

Vinyl acetate polymers are made by emulsion polymerization and the product emulsions are well known in the art. They are large items of commerce and are used in a wide variety of applications, many of which are also applications for the hybrid polymer emulsions of this invention. These emulsions are prepared by the addition of vinyl acetate and other monomers such as ethylene to water containing a surfactant and/or a protective colloid. These surfactants can include anionic, non-ionic and cationic surfactants, but the anionic surfactants are not preferred since they can neutralize amine hardeners which could lead to premature coagulation. If anionic surfactants are used, their level must be carefully controlled. Non-ionic surfactants are preferred and include ethoxylated alkyl phenols, such as nonyl phenol and ethylene oxide/propylene oxide copolymers. Protective colloids can also be used as the emulsifying component and are preferred for use in this invention. Principle among these are poly(vinyl alcohol) and cellulosics such as hydroxyethyl-cellulose. These emulsifying agents are present in the product emulsion of the vinyl acetate polymer and are carried into the emulsion of the hybrid polymer of epoxy and vinyl acetate polymer. In fact, it is generally unnecessary to use additional emulsifying agent unless the proportion of epoxy resin is at the high end of its range. If additional emulsifier is used it can be one of those named above for the vinyl acetate polymerization.

In order to polymerize vinyl acetate and the comonomers, free radical initiators are added to the emulsion. These initiators include organic peroxides, azo initiators such as 2,2'-azoabisisobutyronitrile, peroxysulfates, and redox initiator systems. Redox initiation systems include the persulfate-bisulfate system, chlorate-bisulfate system, hydrogen peroxide-iron system, hydroperoxide-iron system, hydroperoxide-amine system, and the like. Specific systems include combinations of sodium, potassium or ammonium persulfate with various reducing agents such as sodium hydrogen sulfite, ascorbic acid, erythrobic acid, sodium formaldehyde sulfoxylate, and the like. Chain transfer agents such as thiols and mercaptans can be added to control the molecular weight of the polymer. The residues of these initiator systems or chain transfer agents are present in the product polymer emulsion but do not interfere with the stability of the epoxy/vinyl acetate polymer emulsion.

Small amounts of additives often used in emulsion polymers, such as UV stabilizers, plasticizers, antioxidants, preservatives, and the like can be present with the vinyl acetate polymer and do not adversely affect the stability of the epoxy emulsion. Other components which affect the reactivity of the polymer, such as causing it to cross-link, should not be included as these could lead to premature coagulation of the hybrid polymer emulsion. The copolymer emulsions useful in the invention are, therefore, essentially a polymer of the monomers named, water and one or more emulsifying agents as described above.

It is also important that the vinyl acetate polymer be formed independently of the epoxy resin. As described in the Background section, above, conventional wisdom has been to try to build stability into emulsions of epoxy resin hybrids by polymerizing the modifying polymer in the presence of the epoxy resin. The requirement of this invention that the vinyl acetate polymer be made independently of the epoxy resin is, therefore, counter-intuitive. While not to be bound by theory, it is believed that this requirement may be a key to the remarkable unexpected stability of the hybrid polymer emulsions. In fact, attempts to employ the noted invention to styrene-butadiene emulsion did not yield stable emulsions upon epoxy addition.

The hardener for the epoxy resin is isophoronediamine, referred to herein as IPDA. This is a known chemical and is known as a curative for epoxies. It has not been appreciated, however, that IPDA could exhibit the unique behavior in the hybrid polymer emulsions demonstrated in the Examples given herein. The IPDA is incorporated into the hybrid polymer emulsion in a variety of ways. Normally it is added as a water solution or dispersion to the preformed hybrid polymer emulsion. Alternatively, it can be added first to the vinyl acetate polymer emulsion before incorporating the epoxy resin, or it can be added as the vinyl acetate polymer emulsion and the epoxy resin are being combined. The amount of isophoronediamine to be added is normally the stoichiometric amount required to react with the epoxide groups, one amine hydrogen per epoxide group. It is possible to use somewhat less than the stoichiometric amount to reduce the extent of cure, but there is no advantage in using more than the stoichiometric level of diamine.

It is preferred to use IPDA alone as the epoxy hardener, but small amounts of other amine hardeners known in the art can be added up to 25 weight percent of the IPDA used. Such hardeners can be incorporated only if they do not dramatically affect the storage stability of the one-pot system, for example by reducing its storage life to less than one month. Any such added hardeners should also function as a curative at room temperature or, at least, not interfere with the ability of the IPDA to do so.

Emulsifying agents in addition to those carried forward with the vinyl acetate polymer emulsion can be used to achieve improved storage stability. This is sometimes advisable when the amount of epoxy resin in the system is in the upper end of its range. The added emulsifier can be one of the surfactants or protective colloids used in the vinyl acetate polymerization or it can be different. As with the surfactant preferred for the polymerization, it is best if it is non-ionic. Examples of useful surfactants include ethoxylates obtained by reaction of ethylene oxide with alcohols or amines, including $C_{12}$ to $C_{18}$ alcohols, alkyl phenols, fatty acid ethanolamines, fatty amines, and the like. Ethylene oxide block copolymers including ethylene oxide-propylene oxide block copolymers and ethylene oxide-silicone rubber block copolymers can also be useful. While not preferred, anionic surfactants such as alkyl sulfates, sulfonated fatty acids, alkylaryl sulfonates, alkyl sulfonates, alkylaryl disulfonates, and the like can be used.

The amount of epoxy resin which can be emulsified with the vinyl acetate polymer emulsion can range from 5 to 70 parts by weight per 100 parts by weight of the vinyl acetate polymer and epoxy resin combined. It is preferred, however, to limit the proportion of epoxy resin to 50 parts by weight and to use at least 20 parts per 100 parts of the hybrid polymers. It has been found that liquid epoxy resin can be easily incorporated into the polymerization product emulsions of poly(vinyl acetate), and copolymers of vinyl acetate with ethylene or n-butyl acrylate at levels up to and exceeding 60 weight percent based on solids. The resultant emulsions are stable with up to 40 weight percent epoxy resin, based on solids, without the use of additional surfactant. Addition of modest amounts of non-ionic surfactant is useful when higher levels of epoxy are employed.

Other polymer emulsions can be added to the epoxy/vinyl acetate polymer hybrid emulsion to achieve further modification of the final product. These include additional vinyl acetate based emulsions, acrylate emulsions, styrene-butadiene emulsions, natural rubber emulsions, and the like. The only requirement of such added emulsions is that they do not reduce the storage stability of the hybrid polymer emulsion to less than one month. With the same proviso, certain catalysts and reactive diluents can be incorporated. Examples of catalysts include tris(dimethylaminoethyl) phenol, diazobicyclooctane, dimethylaminomethylphenol, triethyleneamine, benzyldimethylamine, imidazoles, and the like. Examples of reactive diluents include monofunctional epoxides, n-butyl glycidyl ether, o-cresol glycidyl ether, and the like. Non-reactive plasticizers such as dibutyl phthalate, dioctyl phthalate, and the like can be added to achieve more flexible compositions. Protective colloids such as poly(vinyl alcohol), hydroxyethyl cellulose, poly(N-vinyl pyrrolidone), and the like can be added to the hybrid polymer emulsion to provide additional emulsion stability as well as to modify the rheological properties and provide additional freeze-thaw stability. Another possibility is the addition of vinyl alcohol/vinyl amine copolymers.

One of the problems which might be expected with a one pot system involving vinyl ester based emulsions with epoxy resin and amine curative in combination is an increase in pH resulting from the base catalyzed hydrolysis of vinyl acetate groups to vinyl alcohol. If this is occurring, it surprisingly does not appear to affect the storage stability of the hybrid polymer emulsion, nor the curing rate of the epoxy, nor the mechanical properties of the final product. The products of this invention appear to cure as the emulsion is applied to a surface and loses water and curing continues to take place in the cast film itself. It was found that curing is also occurring in the emulsion during storage, but such cure does not adversely affect the emulsion to be cast and formed into the useful products which make the one-pot system so valuable.

Other aspects and embodiments of our invention will be apparent to those skilled in the art from the following examples which are illustrative only and should not be construed to limit the invention unduly.

EXAMPLE 1

Emulsion blends were prepared of 40% epoxy resin (Epon 828, Bisphenol A plus epichlorohydrin epoxy resin, $M_n$~377, obtained from Polysciences and Aldrich, a commercial product of Shell Chemical) in two vinyl acetate/ethylene (VAE) copolymer emulsions (Airflex® A-400, contains PVOH protective colloid at 55 weight percent solids, and Airflex® A-405, nonionic surfactant at 55 wt % solids, $T_g$=7° C., 0.17 μp particle size, both products of Air Products and Chemicals, Inc.). The particle size distribution was determined using a disc centrifuge method and the value for accelerated sedimentation was determined. The values are listed in Table 1.

TABLE 1

| Emulsion | Particle Size Distribution | | | Poly-dispersity | Accelerated Sedimentation |
|---|---|---|---|---|---|
| | $D_n$ | $D_s$ | $D_w$ | $D_w/D_n$ | |
| A-400 | 0.596 | 0.729 | 0.933 | 1.565 | |
| 60% A-400 40% Epon 828 | 0.683 | 0.799 | 0.974 | 1.426 | 8 percent |
| A-405 | 0.140 | 0.172 | 0.220 | 1.571 | |

TABLE 1-continued

| Emulsion | Particle Size Distribution | | | Poly-dispersity | Accelerated Sedimentation |
|---|---|---|---|---|---|
| | $D_n$ | $D_s$ | $D_w$ | $D_w/D_n$ | |
| 60% A405 40% Epon 828 | 0.162 | 0.197 | 0.238 | 1.469 | 3 percent |

$D_n$ is number average particle size.
$D_s$ is surface average particle size.
$D_w$ is weight average particle size.

The data of Table 1 show that epoxy resin can be readily dispersed in VAE emulsion and that the resulting dispersion is relatively stable before the addition of any curative for the epoxy resin.

Isophoronediamine (IPDA) was dispersed in the A-405/Epon 828 (60/40 solids basis) emulsion blend quite easily. Cast films were prepared from this composition using two different conditions of cure, at room temperature (RT) and at 100° C. Tensile properties on the cast films are given in Table 2.

TABLE 2

| Cure Conditions | Tensile Modulus (psi) | Tensile Strength (psi) | Elongation (percent) |
|---|---|---|---|
| 3 days at RT | 12,090 | 1,358 | 252 |
| 3 days at RT + 1 hour at 100° C. | 35,420 | 2,421 | 63 |

These data show good room temperature cure for the IPDA with further cure taking place within a short time at elevated temperature. An interesting aspect of this emulsion blend in addition to the ease of dispersing the isophoronediamine in the A-405/epoxy emulsion blend is the stability of the blend in the emulsion state. After several days, there was surprisingly no change in viscosity.

In a run which followed up on this result, isophoronediamine was added to A-405 VAE emulsion at 20 wt % (solids basis) and was quickly dispersed yielding a stable emulsion. This emulsion was added to the A-405/epoxy 60/40 (solids basis) emulsion so that the epoxy/hardener ratio was at stoichiometric addition. The emulsion was cast right after preparation and mechanical properties were determined after 3 days at room temperature and also with 1 hour at 100° C. The epoxy+hardener content of the resultant dried film was 34 wt %. Tensile properties were determined on the cast film and the results are given in Table 3.

TABLE 3

| Cure Conditions | Tensile Modulus (psi) | Tensile Strength (psi) | Elongation (percent) |
|---|---|---|---|
| 3 days at RT | 6,055 | 1,253 | 430 |
| 3 days at RT + 1 hour at 100° C. | 34,635 | 2,262 | 139 |

The above data clearly indicate that this blend exhibits a slow reaction rate at room temperature. The above emulsion blend was also aged for 22 days at room temperature without any significant change in viscosity as noted by the data obtained using a Brookfield Viscometer and reported in Table 4.

TABLE 4

| Time after emulsion preparation (hours) | 0.167 | 1 | 5 | 18.7 | 52.7 | 172 | 338 | 508 |
|---|---|---|---|---|---|---|---|---|
| Viscosity (cps) | 550 | 550 | 500 | 450 | 450 | 400 | 350 | 350 |

The mechanical properties on the film cast of the emulsion noted above after emulsion aging of 22 days are given in Table 5.

TABLE 5

Emulsion Aged for 22 Days

| Cure Conditions | Tensile Modulus (psi) | Tensile Strength (psi) | Elongation (percent) |
|---|---|---|---|
| 2 days at RT | 24,670 | 2,225 | 193 |
| 2 days at RT + 1 hour at 100° C. | 53,290 | 3,273 | 152 |

As shown by the data of Table 5, the aged emulsion exhibited much better room temperature curing properties than the same emulsion which was not aged (see Table 3). This result was unexpected in that the physical properties of the cast film improved with emulsion aging. The excellent stability of the emulsion over a one-month time frame was even more surprising. A one-pot system in which the epoxy and hardener are mixed in the same container but which has long term stability along with rapid room temperature cure is a highly desirable objective but a very difficult one to achieve.

COMPARATIVE EXAMPLE 2

Another water soluble amine hardener, triethylenetetramine (TETA), was evaluated as a hardener in an epoxy/VAE hybrid emulsion. Two hundred grams of an epoxy(Epon 828)/A-405 emulsion (55% total solids; 40 wt % epoxy solids basis), 5.28 grams TETA, and 5.28 grams of distilled water were mixed. The TETA and water were premixed then added with stirring to the epoxy/VAE emulsion. The emulsion was stable for over two weeks but after 18 days it started to gel and thus did not exhibit the same room temperature stability as the system of Example 1 based on isophoronediamine as the curative. The mechanical properties on the TETA cross-linked epoxy/VAE hybrid are given in Table 6.

TABLE 6

| Cure Conditions | Tensile Modulus (psi) | Tensile Strength (psi) | Elongation (percent) |
|---|---|---|---|
| 3 days at RT | 3,260 | 1,565 | 411 |
| 3 days at RT + 1 hour at 100° C. | 23,970 | 2,744 | 87 |

In view of the low modulus value of the above data for RT cure, TETA used as a cross-linker did not initially exhibit good room temperature cure.

EXAMPLE 3

Since isophoronediamine and TETA exhibited interesting characteristics as cross-linkers for a water based epoxy system (short term emulsion stability at room temperature as a one-pot system), samples were prepared to evaluate the emulsion stability under accelerated aging at 60° C. as well as obtain results over longer periods of time at room temperature. Emulsion viscosity, grit formation, and coating quality were used as an assessment of the end of emulsion stability. The comparative results are given in Table 7.

TABLE 7

| Sample Description | Emulsion Stability at | |
|---|---|---|
|  | Room Temp. | 60° C. |
| A-405/Epon 828 (60/40 solids) + | | |
| IPDA (stoichiometric) | 5.5 months | 68 hours |
| IPDA (75% stoichiometric) | 6 months | 88 hours |
| IPDA (stoichiometric) + 2.5 wt. % Igepal Co-630 (solids basis) | >6 months | 112 hours |
| TETA (stoichiometric) | 18 days | 6 hours |

These data show that isophoronediamine is far superior to TETA as a one-pot curative for epoxy/VAE hybrid polymeric compositions.

EXAMPLE 4

Dispersions of A405/Epon 828/IPDA were prepared at 55 wt. solids at various weight ratios of VAE to epoxy resin, solids basis, with the addition of stoichiometric levels of IPDA based on included epoxy. The samples were prepared by premixing IPDA with the amount of distilled water needed to maintain 55 wt. % solids for the final composition. The epoxy was heated to 50° C. and added to the A-405 VAE with stirring and the water/IPDA was added intermittently during the mixing process. The resultant dispersions were allowed to set for one day and then cast into thick films on silicone release paper. The films were released after two days, cut into tensile specimens 30 mils thick and placed in a desiccator. After seven days elapsed time from casting at room temperature, mechanical properties were obtained both as is and after an additional 1 hour cure at 100° C. Tensile properties were determined at room temperature with a strain rate of 2 inches per minute. Stress values were obtained at 5% strain. The results of these measurements on films cast one day after preparation of the dispersions are given in Table 8.

TABLE 8

| VAE Epoxy Ratio | Room Temperature Cure (7 days) | | | RT (7 days) + 1 hour @ 100° C. | | |
|---|---|---|---|---|---|---|
|  | Stress* (psi) | Tensile Strength (psi) | Elongation (%) | Stress* (psi) | Tensile Strength (psi) | Elongation (%) |
| 100/0 | 48 | 1428 | 576 | | | |
| 90/10 | 57 | 1515 | 537 | 73 | 1914 | 474 |
| 80/20 | 192 | 2305 | 345 | 243 | 2766 | 275 |
| 70/30 | 280 | 2464 | 255 | 399 | 2612 | 176 |
| 60/40 | 460 | 2847 | 216 | 686 | 3008 | 126 |
| 50/50 | 644 | 2580 | 133 | 1154 | 2788 | 50 |

*at 5% strain

The data of Table 8 demonstrate that the epoxy resin improves the physical properties of the VAE polymer even at low levels and at room temperature cure with further improvements realized as the epoxy level is increased.

EXAMPLE 5

The same dispersions of Example 4 were aged (in the emulsion state) for one month at room temperature. They were then cast into thick films on silicone release paper. The cast films were released after 2 days, cut into tensile specimens and placed in a desiccator. After seven days from casting, the mechanical properties were obtained on the dry samples at 23° C. Additional samples were heated to 100° C. for 1 hour in an air-circulating oven, allowed to cool, and mechanical properties were obtained. The strain rate for testing was 2"/minute and stress was measured at 5% strain. The results are given in Table 9.

TABLE 9

Properties of Films Cast after One Month Storage of the Emulsion

| VAE Epoxy Ratio | Room Temperature Cure (7 days) | | | RT (7 days) + 1 hour @ 100° C. | | |
|---|---|---|---|---|---|---|
| | Stress (psi) | Tensile Strength (psi) | Elongation (%) | Stress (psi) | Tensile Strength (psi) | Elongation (%) |
| 90/10 | 185 | 2175 | 428 | 184 | 2397 | 381 |
| 80/20 | 427 | 2834 | 283 | 430 | 3219 | 262 |
| 70/30 | 632 | 2620 | 200 | 818 | 3150 | 169 |
| 60/40 | 867 | 2870 | 166 | 1246 | 3612 | 122 |
| 50/50 | 1202 | 2512 | 94 | 1925 | 3379 | 68 |

The data of Example 5, Table 9, compared to the data of Example 4, Table 8, show that the properties of films cast after storage of the dispersions for a month were even better than for the films cast within a day after preparation of the dispersions.

EXAMPLE 6

Prior work had shown that VAE/epoxy/IPDA (A-405+ Epon 828+isophoronediamine) one-pot systems were stable for up to six months of room temperature storage, exhibiting room temperature curing kinetics upon casting (dehydration). Several of these systems reached one year storage with zero to minimal change in the emulsion (only minor sedimentation which was easily dispersed). Tensile properties were determined on four different cast films formed from such systems, two of the films cast after initial preparation of the dispersion systems and two films cast after storage of the systems for one year. One system was formed from A-405 VAE/Epon 828/IPDA in a weight ratio of 62.3/30.8/6.9, solids basis, 55 wt % solids (System A), and the other from the same components in a ratio of 56.4/35.6/8, solids basis, 55 wt % solids (System B). Additional surfactant (Igepal Co-887) was added to System B at 0.6 wt % (solids basis) based on the overall composition. System A had no additional surfactant. The films cast after initial preparation of the systems were conditioned for ten days at room temperature and also for 10 days at RT plus 1 hour at 100° C. The films cast after storage of the systems for one year were conditioned for 7 days at RT and for 7 days at RT plus 1 hour at 100° C. prior the tensile measurements. The properties of the cast films are given in Table 10.

TABLE 10

Mechanical Property Results on A-405/Epon 828/IPDA One-Pot Hybrids As a Function of Storage Time

| System | Storage Time | Conditioning | Modulus (psi) | Tensile Strength (psi) | Elongation (%) |
|---|---|---|---|---|---|
| A | None | 10 days @ RT | 82,750 | 2815 | 193 |
| A | None | +1 hr 100° C. | 97,620 | 3431 | 120 |
| B | None | 10 days @ RT | 56,090 | 2641 | 165 |
| B | None | +1 hr 100° C. | 62,800 | 3353 | 106 |
| A | One year | 7 days @ RT | 72,970 | 2581 | 91 |
| A | One year | +1 hr 100° C. | 120,600 | 3003 | 96 |
| B | One year | 7 days @ RT | 125,500 | 2466 | 63 |
| B | One year | +1 hr 100° C. | 175,000 | 3062 | 80 |

The results indicate only modest changes resulting from the extended storage, namely in higher modulus after storage with a loss in elongation and strength. These changes are not considered to be major and could occur slowly in the cast film after one year. These results show real promise for the one-pot VAE/epoxy/IPDA composition that exhibits room temperature curing properties. At lower epoxy levels the emulsion stability should be at least as good and probably improved. At higher levels additional surfactant would be desired.

EXAMPLE 7

Figure 1:
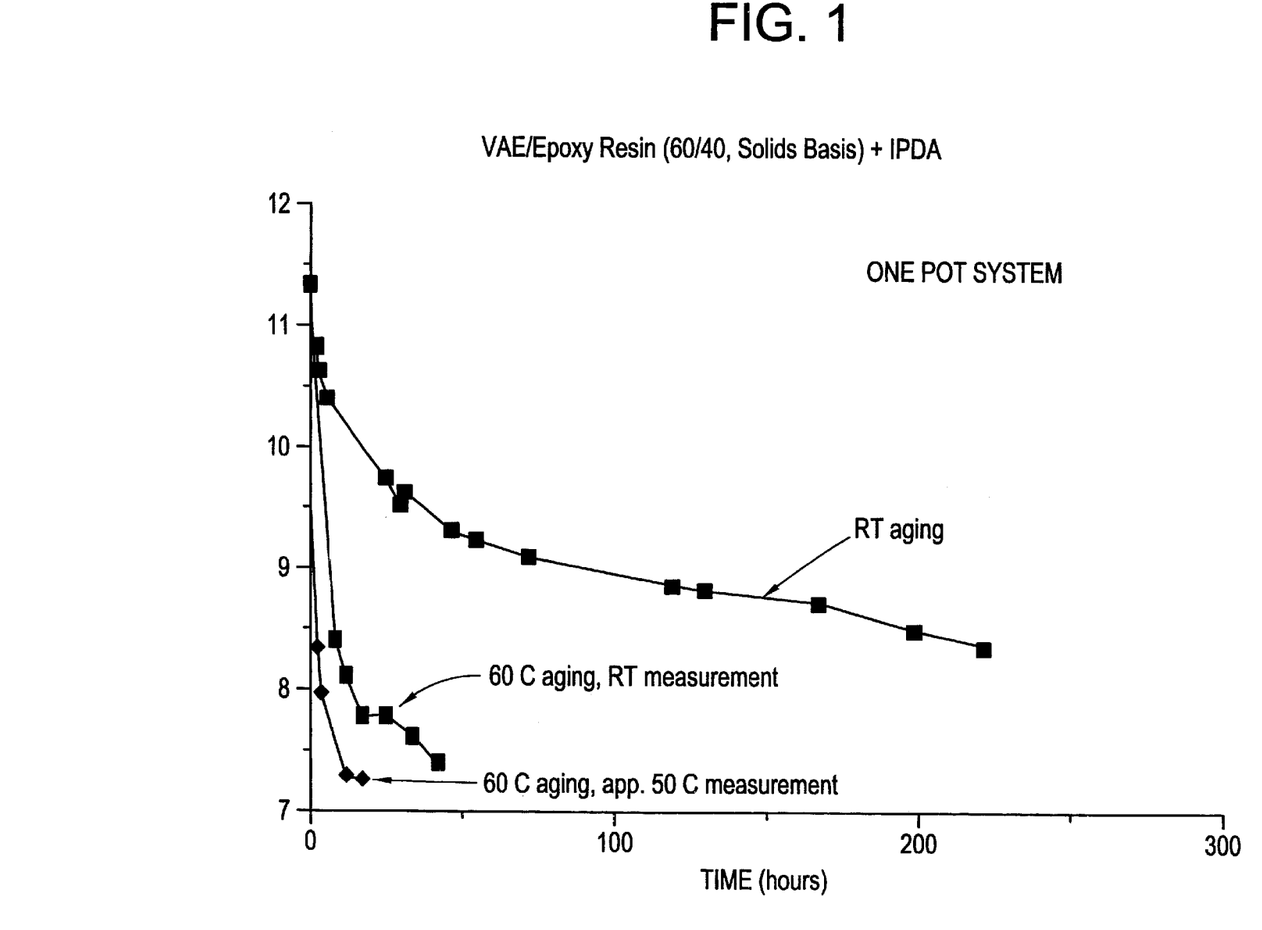
FIG. 1 is a graph showing the change in pH with respect to time after formulation for a one-pot system emulsion of an epoxy resin, a vinyl acetate/ethylene copolymer, and isophoronediamine.

It has been observed that the addition of IPDA results in a high pH for the one-pot system. Base induced hydrolysis might be expected to hydrolyze the VAE to a vinyl alcohol/ vinyl acetate/ethylene copolymer leading to unacceptable properties. If this is occurring, it does not appear to be negatively affecting the storage stability, curing rate, or resultant mechanical properties. Since VAE (A-405)/epoxy (Epon 828) at a 60/40 wt. ratio (solids basis) with stoichiometric addition of IPDA exhibits room temperature storage properties along with room temperature curing kinetics, further characterization was conducted on this blend. This Example reports work performed to monitor pH of this system over time. As the IPDA can diffuse out of the water phase and into the VAE/epoxy phase, the measure of pH versus time can determine the reaction kinetics of the epoxy with IPDA in the water dispersion. It can be assumed that the IPDA will continue to diffuse into the VAE/epoxy phase as the IPDA in the VAE/epoxy phase reacts and thus shifts the equilibrium. The system monitored involved the addition of epoxy resin Epon 828 to A-405 VAE emulsion with stirring. Additional water was added to maintain 55 wt. solids. IPDA diluted with equal parts of water was added slowly with stirring using an eyedropper. The level of IPDA added represented the stoichiometric level based on the epoxy in the system. The pH was monitored on samples held at 60° C. and measured at ~50° C. and at room temperature and on other samples held and measured at room temperature. The pH is temperature dependent; thus two conditions were noted for samples held at 60° C. The pH was measured on undiluted samples with an Orion pH meter model 520A. The results are illustrated in FIG. 1. It is noted that the pH decreased rapidly thus presumably preventing the high hydrolysis that would be expected at the higher pH of the initial sample.

EXAMPLE 8

A dispersion of A-405 VAE emulsion containing 30 wt. % epoxy resin, Epon 828, (solids basis) was prepared as in the above examples. Stoichiometric amounts of various water soluble amine curatives were then added to 200-gram quantities of the A-25.

405 VAE/epoxy emulsion and the pH was monitored over time. The data for the results are given in Table 11.

TABLE 11 pH Measured at a Time in Hours After Preparation

| Amine Curative | 0.167 hour | 0.5 hour | 1 hour | 2 hours | 3.5 hours | 5 hours | 8 hours | 23 hours | 143 hours |
|---|---|---|---|---|---|---|---|---|---|
| IPDA | 10.87 | 10.83 | 10.78 | 10.66 | 10.53 | 10.43 | 10.14 | 9.59 | 8.54 |
| TETA | 10.30 | 10.32 | 10.34 | 10.35 | 10.36 | 10.37 | 10.34 | 10.33 | 9.97 |
| Jeff. D-230 | 10.38 | 10.37 | 10.39 | 10.40 | 10.38 | 10.42 | 10.39 | 10.34 | 9.92 |
| Dytek A | 11.33 | 11.36 | 11.36 | 11.35 | 11.29 | 11.26 | 11.14 | 10.75 | 9.71 |
| MXDA | 10.41 | 10.43 | 10.41 | 10.41 | 10.36 | 10.31 | 10.19 | 9.81 | 8.91 |

Jeff. D-230 is Jeffamine D-230 which is a polyoxyalkyleneamine, a product of Texaco.
Dytek A is 2-methyl-1,5-pentanediamine, a product of DuPont.
MXDA is m-xylylenediamine.

The above data clearly demonstrate that isophoronediamine exhibits the fastest pH drop (12% in 23 hours) compared to other water soluble amine curatives. This is important because it is desirable to minimize the time that the emulsion is exposed to high pH to avoid hydrolysis of the vinyl acetate groups to vinyl alcohol groups. Such hydrolysis would yield increased water sensitivity. These results also show a uniqueness of isophoronediamine relative to the other water soluble amine curatives in the transfer of the amine from the water phase to the polymer phase.

EXAMPLE 9

A series of emulsion/epoxy/hardener ternary blends were prepared to assess the effect of emulsion type, emulsion/epoxy ratio, and hardener type on accelerated storage stability at 60° C. The blends were prepared by addition of the epoxy to the emulsion with stirring as noted in the above Examples. The solids level was maintained at 55 wt. %. The amine hardeners were diluted with equal parts of water and added slowly with an eyedropper with stirring. The amine hardener level was added at stoichiometric levels based on the epoxy in the blends. These blends were individually sealed in glass containers and exposed to 60° C. in an air-circulating oven. The appearance of the samples was monitored at various time intervals (generally every ½ hour up to four hours and from 2 to 4 hours thereafter). The observed results are given in Table 12. The identities of the emulsion and hardener are listed, as are the weight ratios of the vinyl acetate copolymer emulsion to epoxy resin which in all cases was Epon 828.

TABLE 12

Stability of Emulsions of Vinyl Acetate Polymer/Epoxy/Hardener Combinations

| Emulsion | Emulsion/Epoxy Ratio | Hardener | Stability Results (accelerated test at 60° C.) |
|---|---|---|---|
| A-400 | 70/30 | IPDA | Sedimentation in 157 hours |
| A-124 | 70/30 | IPDA | Coagulated in ½ hour |
| A-809 | 70/30 | IPDA | Minor sedimentation at 187 hours |
| V-884 | 70//30 | IPDA | Coagulated at 48 hours |
| F-380 | 70/30 | IPDA | OK at 195 hours |
| A-405 | 90/10 | IPDA | OK at 148 hours |
| A-405 | 80/20 | IPDA | OK at 148 hours |
| A-405 | 70/30 | IPDA | OK at 148 hours |
| A-405 | 60/40 | IPDA | Coagulated at 101 hours |
| A-405 | 50/50 | IPDA | Coagulated at 52 hours |
| A-405 | 60/40 | AEP | Coagulated after 3 hours |
| A-405 | 60/40 | Ancamine | Coagulated after 2 hours |
| A-405 | 60/40 | Dytek A | Sedimentation at 123 hours |
| A-405 | 60/40 | MXDA | OK at 148 hours; deep brown color |

A-400 and A-405 are vinyl acetate/ethylene copolymer emulsions; PVOH stabilizer for A-400.
A-124 is an emulsion of a self cross-linking vinyl acetate/ethylene polymer.
A-809 is a vinyl acetate/ethylene copolymer emulsion, nonionic stabilizer.
V-884 is a polyvinyl acetate homopolymer emulsion.
F-380 is a vinyl acetate/n-butyl acrylate copolymer emulsion, nonionic stabilizer.
AEP is aminoethylpiperazine.
Ancamine was Ancamine 2049 which is 3,3'-dimethylenedi (cyclohexylamine).

As shown by the above data, A-405 and F-380, which are vinyl acetate copolymers, produced the best stability for the emulsions tested. Lower epoxy content correlates with improved emulsion stability. Dytek A and m-xylylenediamine (MXDA) hardeners evidenced good long term stability, but these hardeners have definite drawbacks in terms of mechanical properties and color of the final product. Mechanical property evaluations have shown IPDA to be superior to Dytek A, particularly on room temperature cure, and MXDA imparted a deep brown color to the emulsion/epoxy mixture whereas IPDA is virtually colorless. IPDA clearly showed the best results when all property considerations are included.

EXAMPLE 10

A sample was prepared based on 50/50 A-405 VAE/Epon 828 (solids basis) with surfactant added. The composition consisted of 100 grams of A-405 to which 55 grams of Epon 828 was added with stirring along with 45 grams of distilled water to keep the solids level constant. To this mixture 12.44 grams of isophoronediamine was then slowly added with stirring. A slurry of 2 grams of Igepal Co-630 surfactant in 8 grams of water was then added with stirring. The resultant VAE/epoxy hybrid was stored for over 10 months at room temperature. The emulsion appeared stable and films were cast at room temperature and stored in a desiccator after initial drying. The mechanical properties were obtained after 7 days at room temperature and after an additional 1 hour at 100° C. in an air-circulating oven. The results are shown in Table 13.

TABLE 13

| Film Conditioning: | 7 days at Room Temperature | 7 days at RT + 1 hour at 100° C. |
|---|---|---|
| Tensile Modulus (psi) | 231,000 | 210,000 |
| Stress at 2.2% strain (psi) | 1,700 | 1,410 |
| Stress at 5.5% strain (psi) | 2,000 | 1,857 |
| Stress at 11% strain (psi) | 2,278 | 2,235 |
| Stress at 33% strain (psi) | 2,530 | 2,731 |

TABLE 13-continued

| Film Conditioning: | 7 days at Room Temperature | 7 days at RT + 1 hour at 100° C. |
|---|---|---|
| Elongation at Break (%) | 34 | 33 |
| Tensile Strength (psi) | 2,611 | 2,876 |

The data of Table 13 show that good physical properties and excellent cure can be obtained with the compositions of the invention even after storage for 10 months. The cure at room temperature was essentially complete without the additional conditioning at 100° C. This long-term stability with eventual room temperature cure without the addition of hardener at the curing site is a result that has been long sought after.

COMPARATIVE EXAMPLE 11

Other amine hardeners were evaluated for long term stability in VAE/Epoxy resin dispersions and physical properties in the resulting cured film stock. The VAE used was Airflex® A-405 and the epoxy resin was Epon 828. The hardeners evaluated were 3,3'-dimethylenedi (cyclohexylamine) (Ancamine 2049), 2-methyl-1,5-pentanediamine (Dytek A), 4,4'-methylenebiscyclohexylamine (PACM), aminoethylpiperazine (AEP), and polyoxyalkyleneamine (Jeffamine D-230, a product of Texaco). The blends of A-405 VAE/Epon 828 were prepared at a 60/40 weight ratio, solids basis, and 55 wt. % solids. The hardeners were added at the stoichiometric level based on the epoxy level. Samples were cast at room temperature on silicone release paper and released after one day. Tensile specimens were cut from the thick film and placed in a desiccator. Tensile properties were obtained either three, six or eight days after casting for films conditioned at room temperature and for films thus conditioned plus an additional hour at 100° C. Stability and mechanical properties are shown in Table 14. Evaluations of IPDA and TETA from prior Examples are included for comparison.

TABLE 14

| Hardener | Conditioning | Modulus (psi) | Tensile Strength (psi) | Elongation (%) | Stability at 60° C. |
|---|---|---|---|---|---|
| IPDA | 3 days – RT | 12,090 | 1358 | 252 | 101 hours |
| IPDA | +1 hr 100° C. | 35,420 | 2421 | 63 | |
| TETA | 3 days – RT | 3256 | 1565 | 411 | 6 hours |
| TETA | +1 hr 100° C. | 23,970 | 2744 | 87 | |
| PACM | | Would not emulsify | | | |
| Ancamine | 6 days – RT | 8,020 | 1,150 | 314 | 2 hours |
| Ancamine | +1 hr 100° C. | 145,000 | 2,608 | 64 | |
| AEP | 6 days – RT | 13,500 | 880 | 150 | 3 hours |
| AEP | +1 hr 100° C. | 69,800 | 1,500 | 56 | |
| Dytek A | 6 days – RT | 591 | 374 | 451 | 123 hours |
| Dytek A | +1 hr 100° C. | 123,240 | 2,413 | 36 | |
| Jeff. D-230 | 8 days – RT | 24,590 | 2,080 | 215 | 3 months at RT |
| Jeff. D-230 | +1 hr 100° C. | 152,385 | 3,355 | 86 | |

The above data show the remarkably unique character of isophoronediamine in these VAE/epoxy compositions. The composition containing Dytek A showed good stability in the 60° C. accelerated aging test (see Example 9), but it was incapable of room temperature cure. The evaluation of Jeffamine D-230 was not in the accelerated test but was evaluated at room temperature. IPDA excels at room temperature, showing stability for up to one year. The limit of stability for the composition containing Jeffamine D-230, on the other hand, was three months as judged by a rapid increase in viscosity after this period. Jeffamine T-403, also a polyoxyalkyleneamine, a product of Texaco, was used in a similar set of runs. After 8 days at room temperature the cast films had a tensile modulus of 45,670 psi, tensile strength of 2,328 psi and elongation of 121%. With an additional conditioning for one hour at 100° C., the corresponding properties were 106,710 psi modulus, 3,607 psi tensile strength, and 69% elongation. It is concluded that neither hardener is a candidate for a one-pot system for higher epoxy levels.

COMPARATIVE EXAMPLE 12

Evaluations were made with several other amine-type curatives that are suitable for two-pack systems in order to determine the physical properties that could be achieved with different vinyl acetate polymer emulsions. Also of interest was establishing the levels at which epoxy resins can be successfully incorporated into vinyl acetate polymer emulsions. This example shows the preparation of emulsion blends of vinyl acetate/ethylene copolymers with liquid epoxy resin. A sample of 180 grams of Airflex® A-400 emulsion (vinyl acetate/ethylene copolymer emulsion with PVOH protective colloid at 55 wt. % solids) was mixed with EPON 828 liquid epoxy resin. The epoxy was added slowly and appeared to disperse in the emulsion immediately. The resultant composition contained 16.7 wt. % epoxy (solids basis) at 59.5% total solids. One hundred grams of this emulsion blend was mixed with an additional 20 grams of EPON 828 liquid epoxy resin yielding a composition of 37.7 wt. % epoxy (solids basis) and a total solids of 66.25%. The viscosity of this blend was quite high. To 120 grams of this blend were added 25 grams of distilled water with stirring. The viscosity rapidly decreased. This blend contained 37.7 wt. % epoxy (solids basis) at a total solids content of 54.8%. This emulsion appeared to have good stability without evidence of phase separation in several weeks. The emulsion blend of EPON 828/A-400 containing 37.7% epoxy at a total solids content of 54.8% was then mixed with a water based epoxy curing agent (Casamid 360, a commercial polyamine epoxy hardener at 50 wt. % in water). Sixty grams of the epoxyNAE emulsion were mixed with 20 grams of the Casamid 360. The viscosity of the resultant mixture was significantly higher than the epoxy/VAE emulsion. The mixture was cast into a thick film using a doctor blade to control the thickness. The film was tack free in less than 24 hours and the resultant sheet exhibited leathery-like properties. This run demonstrated the ability to emulsify epoxy resin in a VAE emulsion and then cross-link it with a conventional epoxy hardener. The mechanical properties were obtained on the resultant cast sheet after several conditioning procedures as noted in Table 15.

TABLE 15

| Conditioning | Tensile Modulus (psi) | Tensile Strength (psi) | Elongation (percent) |
|---|---|---|---|
| 4 days at Room Temperature | 26,390 | 1,443 | 44 |
| 4 days at RT + 1 hour at 60° C. | 50,040 | 2,082 | 15 |
| 4 days at RT + 1 hour at 100° C. | 94,800 | 3,327 | 11 |

This composition worked well for a two-pack system but would not be suitable for a one-pot system.

COMPARATIVE EXAMPLE 13

Another series of runs was made by preparing epoxy/A-400 emulsion blends as in Example 12 except at different levels of epoxy addition. A commercial amine-type epoxy curative, Epilink 700, a product of Air Products, as a 50 wt. % solution in water, was selected as a cross-linker for the blend. The Epilink 700 was added at the stoichiometric addition level (one epoxy group per amine hydrogen) and the resultant system was stirred until a homogeneous blend was observed. The samples were then cast into thick (20–25 mils: dry) films with a doctor blade. Tensile specimens were die cut from the films and subjected to various types of conditioning as noted in Table 16. This conditioning included two days at room temperature, two days at room temperature plus 4 hours of water immersion, two days at room temperature plus 1 hour at 100° C., and all three types of conditioning sequentially on the cured films. The stress-strain data are given in Table 16.

TABLE 16

| Wt. % Epoxy + Hardener | Conditioning | Tensile Modulus (psi) | Tensile Strength (psi) | Elongation (percent) |
| --- | --- | --- | --- | --- |
| 0 | Room Temperature For Two Days | 8,235 | 1,234 | 481 |
| 16.3 | | 5,346 | 1,115 | 372 |
| 30.4 | | 19,958 | 1,200 | 278 |
| 42.9 | | 48,580 | 1,537 | 100 |
| 53.8 | | 59,560 | 1,846 | 50.7 |
| 68.2 | | 76,040 | 2,547 | 16.7 |
| 0 | RT for 2 Days + Water Immersion for Four Hours | 87 | 98 | 653 |
| 16.3 | | 149 | 159 | 566 |
| 30.4 | | 654 | 283 | 167 |
| 42.9 | | 1,816 | 466 | 106 |
| 53.8 | | 18,390 | 1,241 | 43.3 |
| 68.2 | | 45,430 | 1,639 | 21.4 |
| 16.3 | RT for 2 Days + One Hour at 100° C. | 15,350 | 1,910 | 254 |
| 30.4 | | 58,765 | 2,461 | 78 |
| 42.9 | | 83,130 | 2,883 | 30.8 |
| 53.8 | | 140,960 | 3,640 | 17.1 |
| 68.2 | | 185,580 | 3,935 | 9.7 |
| 16.3 | RT for 2 Days + 1 Hour at 100° C. Followed by Water Immersion for 4 Hours | 607 | 523 | 497 |
| 30.4 | | 18,234 | 1,381 | 156 |
| 42.8 | | 35,600 | 2,325 | 59.6 |
| 53.8 | | 116,450 | 3,159 | 23.7 |
| 68.2 | | 142,840 | 3,532 | 11.5 |

The above data show the high levels at which epoxy resin can be incorporated into a vinyl acetate/ethylene copolymer protected by polyvinyl alcohol. The data also show that Epilink 700 works well for a two-pack system, although the cure is too fast for use in a one-pot system.

The Epilink 700 hardener was also used to investigate the compatibility of epoxy resin with other vinyl acetate copolymer emulsion products. In these runs Epon 828 was emulsified with the Airflex® products A-7200, a VAE at 72 wt. % solids, $T_g=0°$ C., surfactant system of PVOH and nonionic protective colloid; A-405, a VAE at 55 wt. % solids, $T_g=7°$ C., nonionic surfactant, $0.17\,\mu$ particle size; A-430, a VAE/VCl polymer, 52 wt. % solids, $T_g=0°$ C., anionic surfactant, $0.17\,\mu$ particle size; and Flexbond® 150, copolymer of vinyl acetate and dioctyl maleate at 55 wt. % solids, $T_g=-28°$ C., nonionic surfactant, $0.30\,\mu$ particle size. The weight percent solids of the blend was kept the same as the base emulsion.

In each case the viscosity was lower than the base emulsion. Phase separation occurred with A-430 overnight. Phase separation occurred with Flexbond 150 (F-150) within one week. The other emulsions appeared stable. Epilink 700 hardener, 50% solids in water, was added to each emulsion/epoxy mixture, stirred to uniformity and cast into thick films using a doctor blade. The Epilink 700 addition corresponded to stoichiometric addition, one amine hydrogen per epoxide group. With the A-430/epoxy emulsion the viscosity increased significantly. The physical property results on these blends are listed in Table 17. Viscosities are given on the blend of epoxy plus the vinyl acetate polymer emulsion and on this blend plus the amine hardener.

TABLE 17

| Emulsion | Viscosity of Blend (cps) | Viscosity Blend + Hardener (cps) | Conditioning | Tensile Modulus (psi) | Tensile Strength (psi) | Elongation (percent) |
| --- | --- | --- | --- | --- | --- | --- |
| A-7200 | 640 | — | As cast at RT | 40,520 | 1,355 | 15.6 |
| | | | 1 hour at 100° C. | 62,950 | 2,110 | 13.7 |
| | | | 1 hr. at 100° C. + 4 hours water immersion | 48,150 | 1,660 | 16.6 |
| A-405 | 140 | 1,200 | As cast at RT | 79,000 | 2,795 | 77.0 |
| | | | 1 hour at 100° C. | 102,230 | 4,820 | 38.1 |
| | | | 1 hr. at 100° C. + 4 hours water immersion | 85,345 | 4,725 | 51.1 |
| A-430 | 80 | 136,000 | As cast at RT | 54,315 | 1,700 | 11.1 |
| | | | 1 hour at 100° C. | 92,250 | 2,095 | 8.8 |
| | | | 1 hr. at 100° C. + 4 hours water immersion | 71,475 | 2,100 | 12.6 |
| F-150 | 160 | 500 | As cast at RT | 68,140 | 1,655 | 8.8 |
| | | | 1 hour at 100° C. | 77,640 | 1,955 | 9.2 |
| | | | 1 hr. at 100° C. + 4 hours water immersion | 76,315 | 1,695 | 10.7 |

In the blend using A-430 the viscosity increased significantly on addition of the hardener and the blend would not be suitable for a one-pot system. Likewise, phase separation observed for the F-150 blend eliminates this type of polymer emulsion from consideration for a one-pot system. The other emulsions, particularly the A-405, are suitable candidates when combined with a hardener which enables delayed casting. For this purpose, isophoronediamine is uniquely operable. Epilink 700, while unsuitable for use in a one-pot system, gave good results in terms of physical properties of the cast films. The data indicate that it would be a good hardener for use in a two-pack system in which the hardener is added to the epoxy/emulsion blend just before casting or application. Similar results were achieved with Epilink 660 and Epilink 701.

Other advantages, features and embodiments of our invention will be apparent to those skilled in the art from the foregoing disclosure and the following claims without departing from the spirit or scope of the invention.

What is claimed is:

1. A composition comprising a stable one-pot emulsion which is castable at ambient temperature by removal of water said composition produced by adding a liquid epoxy resin and isophoronediamine to a vinyl acetate based polymer emulsion.

2. The composition of claim 1 wherein said vinyl acetate based polymer is selected from polyvinyl acetate homopolymer and copolymers of vinyl acetate with an olefin having two to five carbon atoms per molecule, an acrylate selected from the group consisting of n-butyl acrylate, methyl acrylate, ethyl acrylate, methyl methacrylate, acrylic acid, and methacrylic acid, or maleic anhydride.

3. The composition of claim 1 wherein said polymer of vinyl acetate is a copolymer of vinyl acetate and ethylene.

4. The composition of claim 1 wherein said polymer of vinyl acetate is a copolymer of vinyl acetate and n-butylacrylate.

5. The composition of claim 1 wherein the weight proportion epoxy resin is in the range of 5 to 70 parts by weight in 100 parts of epoxy resin plus vinyl acetate polymer.

6. The composition of claim 1 wherein said weight proportion of epoxy resin is in the range of 20 to 50 parts by weight per 100 parts of epoxy resin plus vinyl acetate polymer.

7. The composition of claim 1 which is stable without significant coagulation for at least one month at ambient temperature.

8. A method of making a stable one-pot emulsion of a polymeric hybrid of an epoxy resin and a polymer of vinyl acetate which comprises forming an aqueous emulsion blend of a liquid epoxy resin and an independently formed polymer of vinyl acetate, and dispersing isophoronediamine in said emulsion blend, said polymeric hybrid being curable and castable at ambient temperature by removal of water from said one-pot emulsion.

9. The method of claim 8 wherein said removal of water from said emulsion can be performed following a period of time of at least one month after said dispersing of isophoronediamine into said emulsion blend.

10. The method of claim 8 wherein the weight ratio of said epoxy resin in said blend is in the range of 5 to 70 parts by weight per 100 parts of said blend.

11. The method of claim 10 wherein said weight ratio is in the range of 20 to 50 parts by weight of epoxy resin per 100 parts of said blend.

12. The method of claim 8 wherein said vinyl acetate based polymer is selected from polyvinyl acetate homopolymer and copolymers of vinyl acetate with an olefin having two to five carbon atoms per molecule, an acrylate selected from the group consisting of n-butyl acrylate, methyl acrylate, ethyl acrylate, methyl methacrylate, acrylic acid, and methacrylic acid, or maleic anhydride.

13. The method of claim 12 wherein said polymer of vinyl acetate is a copolymer of vinyl acetate and ethylene, said copolymer containing at least 60 weight percent vinyl acetate.

14. The method of claim 12 wherein said polymer of vinyl acetate is a copolymer of vinyl acetate and n-butylacrylate, said copolymer containing at least 60 weight percent vinyl acetate.

* * * * *